United States Patent
Halverson (10) Patent No.: US 10,315,391 B1
(45) Date of Patent: Jun. 11, 2019

(54) PRODUCING BULK FABRICATION MATERIAL FROM VEHICLE TIRES

(71) Applicant: Richard G. Halverson, Willard, MO (US)

(72) Inventor: Richard G. Halverson, Willard, MO (US)

( * ) Notice: Subject to any disclaimer, the term of this patent is extended or adjusted under 35 U.S.C. 154(b) by 0 days.

(21) Appl. No.: 15/969,722

(22) Filed: May 2, 2018

(51) Int. Cl.
| | |
|---|---|
| *B32B 1/08* | (2006.01) |
| *B32B 3/10* | (2006.01) |
| *B32B 25/04* | (2006.01) |
| *B29B 17/00* | (2006.01) |
| *C08L 19/00* | (2006.01) |
| *B26D 3/00* | (2006.01) |
| *B29C 65/02* | (2006.01) |
| *B29C 65/48* | (2006.01) |
| *B29C 65/56* | (2006.01) |
| *B29L 31/30* | (2006.01) |
| *B29L 30/00* | (2006.01) |
| *B29L 31/06* | (2006.01) |
| *B29L 31/00* | (2006.01) |

(52) U.S. Cl.
CPC ............ *B32B 25/042* (2013.01); *B26D 3/005* (2013.01); *B29B 17/0042* (2013.01); *B29C 65/02* (2013.01); *B29C 65/4835* (2013.01); *B29C 65/562* (2013.01); *C08L 19/003* (2013.01); *B29L 2030/002* (2013.01); *B29L 2031/06* (2013.01); *B29L 2031/3044* (2013.01); *B29L 2031/73* (2013.01); *B29L 2031/766* (2013.01); *B32B 2250/248* (2013.01); *B32B 2272/00* (2013.01)

(58) Field of Classification Search
CPC ................................................. B32B 2272/00
See application file for complete search history.

(56) References Cited

U.S. PATENT DOCUMENTS

| 1,344,926 A | 6/1920 | Ochs |
| 1,346,609 A | 7/1920 | Revert |
| (Continued) | | |

FOREIGN PATENT DOCUMENTS

| GB | 1586882 | 3/1981 |
| WO | 03023143 A2 | 3/2003 |
| (Continued) | | |

OTHER PUBLICATIONS

McBain, Theodore, U.S. Appl. No. 60/322,808, filed Sep. 11, 2001.

*Primary Examiner* — Ian A Rummel
(74) *Attorney, Agent, or Firm* — Robert H. Frantz (57) ABSTRACT

A block of construction material is fabricated by harvesting a plurality of tread strips from a plurality of tires by, for each tire, removing a tread texture of a tread cap from each tire using a tread removal device while leaving a remaining portion of the tread cap intact with one or more sidewalls and shoulders of each tire, removing the side walls and the entire shoulders from each tire by cutting through the remaining portion of each tread cap, and slicing the remaining portion of each tread cap to produce tread strips. Each strip is preheated, and while maintaining the temperature, stacked onto the gummed previous strips, until a block of desirable size is yielded. Use of fasteners, plates and membranes to maintain the stacked tread strips into a block arrangement is eliminated.

9 Claims, 9 Drawing Sheets

(56) References Cited

U.S. PATENT DOCUMENTS

| | | | |
|---|---|---|---|
| 2,977,864 A | 4/1961 | Pullar | |
| 3,081,035 A | 3/1963 | Le Beau Meyer | |
| 2,892,592 A | 6/1969 | Greene et al. | |
| 3,475,009 A | 10/1969 | Brown | |
| 3,893,619 A | 7/1975 | Bruner | |
| 3,934,540 A | 1/1976 | Bruner et al. | |
| 3,951,384 A | 4/1976 | Hildreth, Jr. | |
| 4,122,795 A | 10/1978 | Doring | |
| 4,286,753 A | 9/1981 | Lee | |
| 4,629,360 A | 12/1986 | Cacossa et al. | |
| 4,655,434 A | 4/1987 | Bronstad | |
| 4,965,115 A | 10/1990 | Cimillo | |
| 5,094,905 A | 3/1992 | Murray | |
| 5,246,754 A | 11/1993 | Miller | |
| 5,284,326 A | 2/1994 | Chiovitti et al. | |
| 5,336,016 A | 8/1994 | Baatz | |
| 5,549,279 A | 8/1996 | Aszkenas | |
| 5,605,282 A | 2/1997 | Snead | |
| 5,645,368 A | 7/1997 | Yunick | |
| 5,704,128 A | 1/1998 | Ciao | |
| 5,746,545 A | 5/1998 | Parker, Jr. | |
| 5,834,083 A | 11/1998 | Pignataro, Jr. | |
| 5,916,932 A | 6/1999 | Nosker et al. | |
| 5,996,901 A | 12/1999 | Young | |
| 6,048,129 A | 4/2000 | Rue | |
| 6,179,215 B1 | 1/2001 | Shea | |
| 6,191,228 B1 | 2/2001 | Nosker et al. | |
| 6,247,651 B1 | 6/2001 | Marinelli | |
| 6,306,484 B1 | 10/2001 | Bove et al. | |
| 6,316,069 B1 | 11/2001 | Bove et al. | |
| 6,366,265 B1 | 1/2002 | Niedermair | |
| 6,368,690 B1 | 4/2002 | Bove | |
| 6,372,069 B1 | 4/2002 | Walls | |
| 6,520,711 B2 | 2/2003 | Kim | |
| 6,604,888 B2 | 8/2003 | Dolan | |
| 6,824,070 B2 | 11/2004 | Halverson et al. | |
| 6,959,877 B2 | 11/2005 | Diamond | |
| 7,714,056 B2 | 5/2010 | Sullivan et al. | |
| 7,931,210 B1 | 4/2011 | Pike et al. | |
| 2003/0010421 A1* | 1/2003 | Coffin | B26D 3/005 156/95 |
| 2003/0164403 A1 | 9/2003 | Fitch et al. | |
| 2004/0089729 A1 | 5/2004 | Diamond | |
| 2004/0129791 A1 | 7/2004 | Halverson et al. | |
| 2005/0065267 A1 | 3/2005 | Sullivan et al. | |
| 2005/0152743 A1 | 7/2005 | Kasraie | |
| 2005/0156055 A1 | 7/2005 | Kenney et al. | |
| 2005/0236609 A1 | 10/2005 | Talbott | |
| 2014/0301781 A1 | 10/2014 | Lindberg et al. | |

FOREIGN PATENT DOCUMENTS

| | | |
|---|---|---|
| WO | 2011060105 A2 | 5/2011 |
| WO | 2013155018 A1 | 10/2013 |

* cited by examiner

PRODUCING BULK FABRICATION MATERIAL FROM VEHICLE TIRES

FIELD OF THE INVENTION

The invention generally relates technologies to reclaim vehicle tires and produce blocks of material suitable for a wide range of product fabrications.

BACKGROUND OF INVENTION

Many vehicles use tires made of rubber and composite resilient materials. After the useful life of the tires, the discarded tires can become an environmental hazard, so various methods have been developed to reclaim used tires for other purposes.

SUMMARY OF THE INVENTION

A block of construction material is fabricated by harvesting a plurality of tread strips from a plurality of tires by, for each tire, removing a tread texture of a tread cap from each tire using a tread removal device while leaving a remaining portion of the tread cap intact with one or more sidewalls and shoulders of each tire, removing the side walls and the entire shoulders from each tire by cutting through the remaining portion of each tread cap, and slicing the remaining portion of each tread cap to produce tread strips. Each strip is preheated, and while maintaining the temperature, stacked onto the gummed previous strips, until a block of desirable size is yielded. Use of fasteners, plates and membranes to maintain the stacked tread strips into a block arrangement is eliminated.

BRIEF DESCRIPTION OF THE DRAWINGS

The description set forth herein is illustrated by the several drawings.

DETAILED DESCRIPTION OF EMBODIMENT(S) OF THE INVENTION

The present inventor has realized that the existing methods of reclaiming used and discarded vehicle tires are limited to either outcome-specific processes or shredding of the tires. For example, the present inventor was previously awarded U.S. Pat. No. 6,824,070 for a railroad cross-tie constructed from a stack of tire portions. While this was a useful end-product for a specific purpose, the end-product was not conducive to being used in products and fabrications other than a railroad cross-tie.

Therefore, the present inventor has realized that there is a need in the art for a tire reclaiming process that yields a product which is suitable for use as a solid raw material, not just a shredded raw material, for subsequent fabrication of a variety of products. At least one objective of the present invention is to yield a block of material from a plurality of reclaimed tires, wherein the yielded block is suitable for additional cutting, shaping, grinding, drilling, and fastening to fabricate other products, not just railroad cross-ties.

Another objective of the present invention includes, but is not limited to, avoiding the need for metal fasteners to keep the layers of reclaimed tire material flat. Another objective of the present invention includes, but is not limited to, avoiding the need for internal steel or metal plates within the yielded block, which have been taught by other sources as a requirement to strengthen and flatten such a block of material. Similarly, another objective of the present invention includes, but is not limited to, avoiding the need for internal membranes within the yielded block, which have been taught by other sources as a method to adhere laminate layers to each other. By eliminating some or all of fasteners, plates and membranes, the cost of the yielded product is reduced, the process complexity is decreased, and the weight of the block is reduced.

Figure 9:
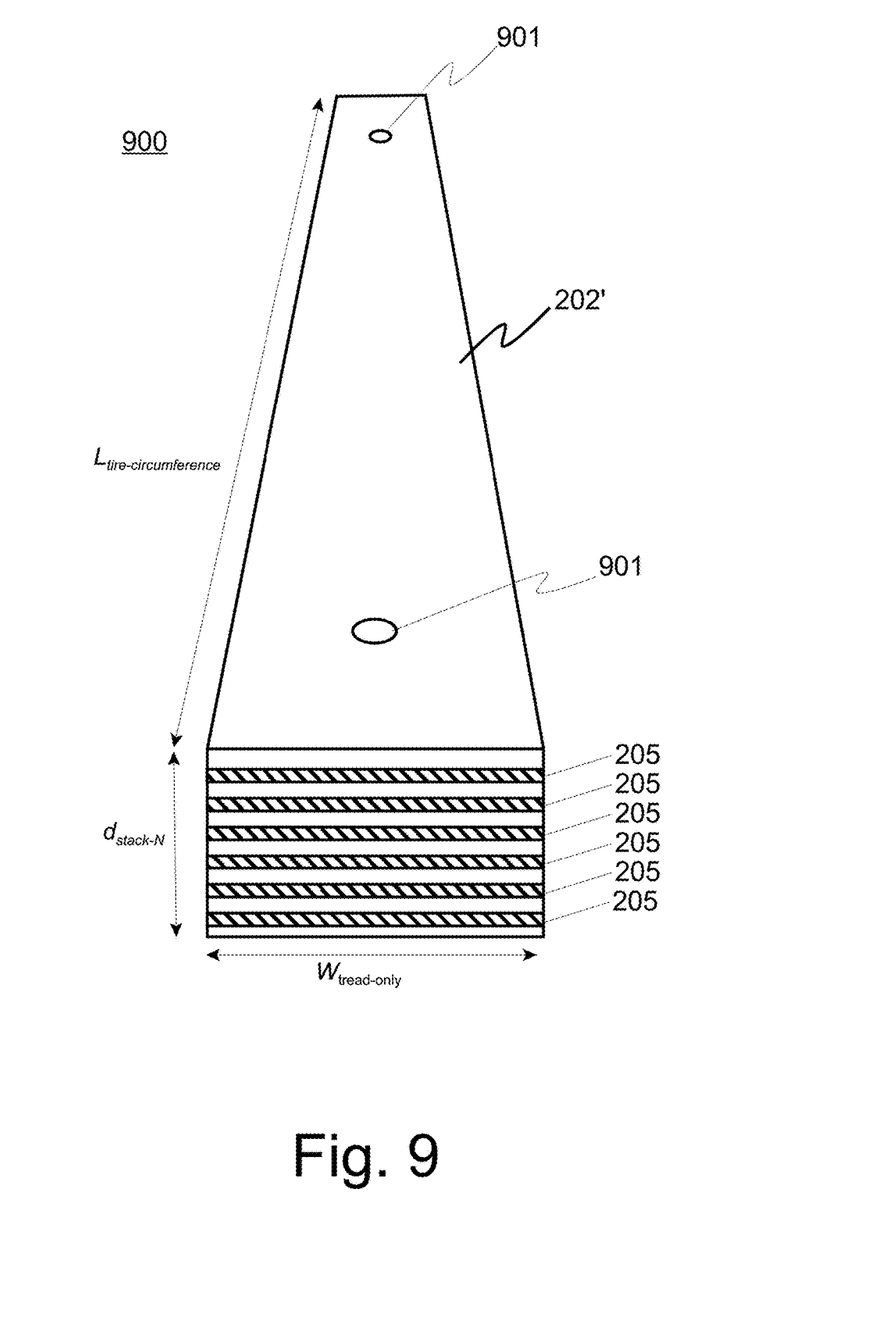
FIG. 9 shows a schematic of such a block as shown in FIG. 8.

An example product yield (900) is shown in FIG. 9, which has a width w, a depth d, and a length L. In one embodiment, the width is that of a portion of the tread of the tires reclaim, $w_{tread-only}$, the depth is that of a stacked plurality of reclaimed elemental work product $d_{stack-N}$, and the length is that of the circumference of the tires which were reclaimed $L_{tire-circumference}$. In at least one embodiment, one or more index holes (901) are provided through the depth d of the block (900), in an essentially orthogonal direction to the surfaces of the elemental work product (layers). These index holes are voids for receiving vertically-oriented pins during the lamination process to align each layer to the previous, lower layer, as will be described in more details. The index holes are not necessarily used for fasteners, as the present method yields a block material which avoids the need for fasteners to retain the layers to each other. Laser drilling, water knife cutting, or standard drilling may be used to form these voids.

Figure 8:
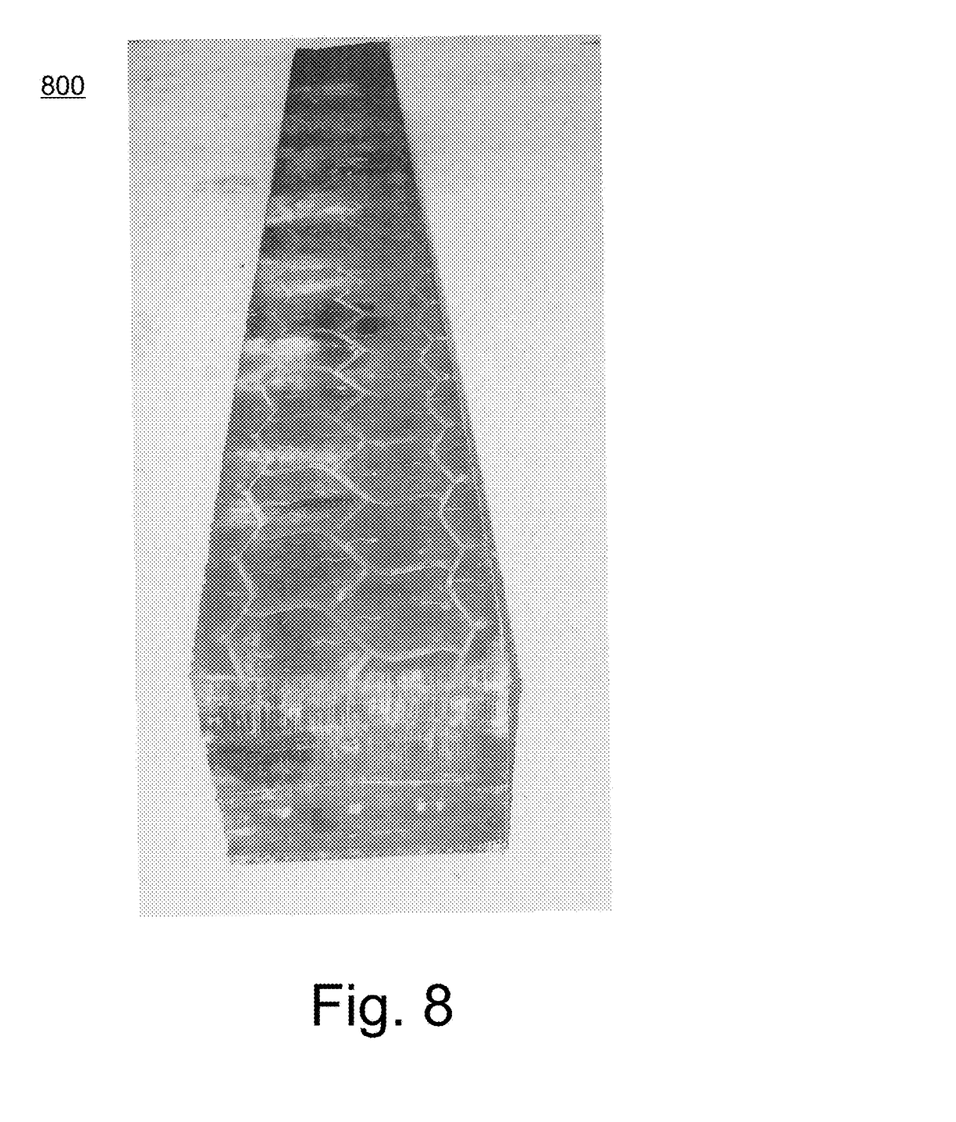
FIG. 8 provides a photograph of an actual block of seven tread strips produced using a process according to the present invention.

FIG. 8 is a photograph of an actual prototype building material block (800), without the indexing holes as shown in FIG. 9. In this photograph, the planarity of the block can be seen, even without the fasteners and internal metal plates of end-products of previous tire reclamation processes.

Figure 2:
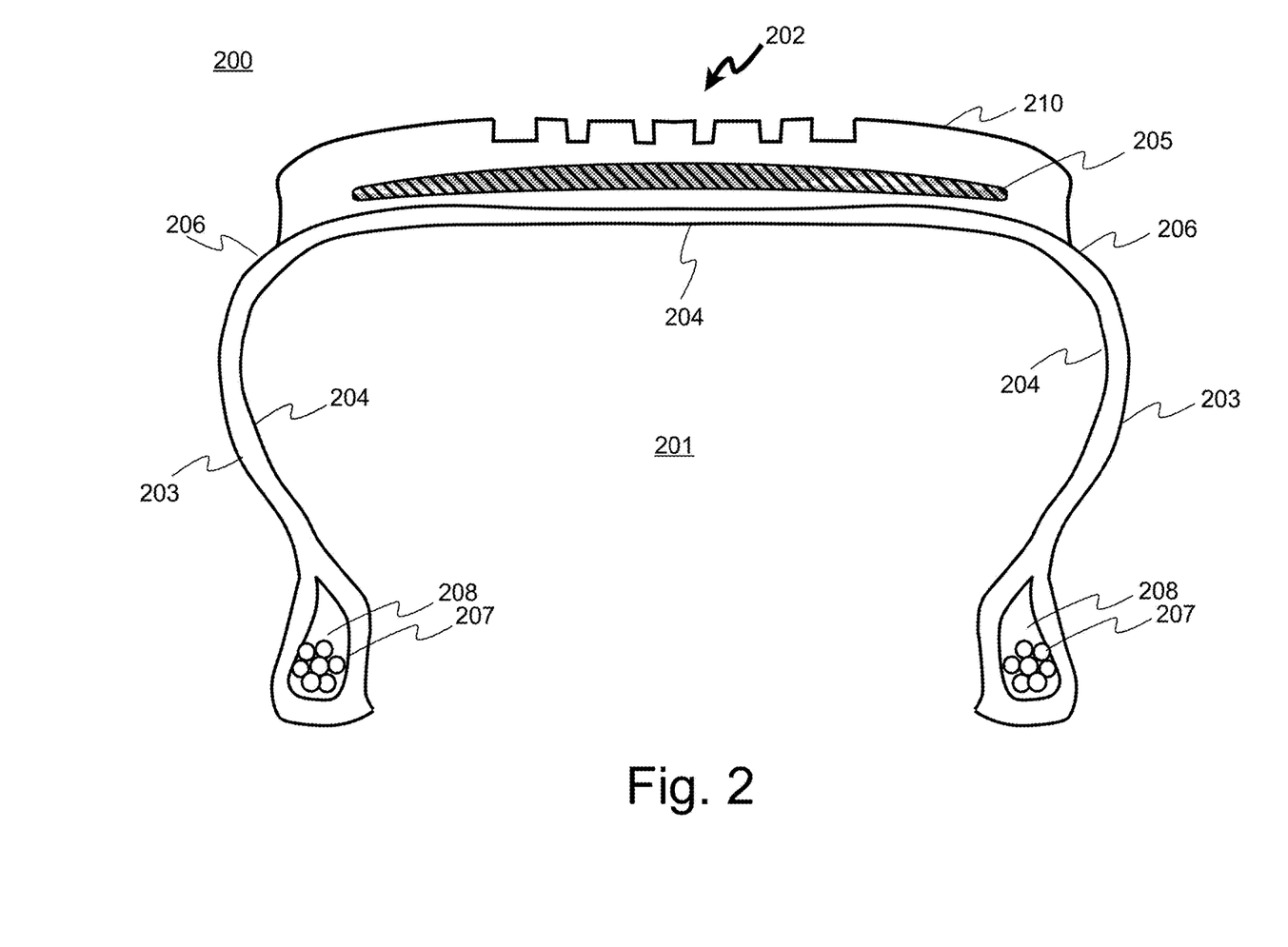
FIG. 2 illustrates a cross-section view of a typical vehicle tire to provide a reference for the components and terminology of the anatomy of typical tires.

Turning to FIG. 2, a cross-section view of a typical vehicle tire (200) is shown, which has two side walls (203) and an interior liner (204) that compose a body for the tire. When mounted on a wheel, the body and wheel form an interior volume (201) for receiving pressurized air to inflate the tire. The tire typically is provided with two beads (207) running through a chaler (208), which provides the structure to maintain the tire on the wheel with an air-tight seal. The tread cap (210) is molded onto the outer portion of the body around the circumference of the tire, and includes a plurality of grooves, blocks, and channels (202) for gripping a roadway, and for channeling water, ice and snow away from the tire. The tread cap encapsulates one or more belts (205)

which provide the structural strength of the tire to maintain its shape while under internal force for the pressurized air in the interior (201). The sidewalls (203) meet the tread cap (210) through a transitional bending portion, the shoulder (206). We will use these terms for the purposes of the present disclosure, while it will be recognized that some other terms as well as different tire architectures are well known in the art. The present invention is applicable to those other tire designs and descriptive terms, as well.

Figure 3:
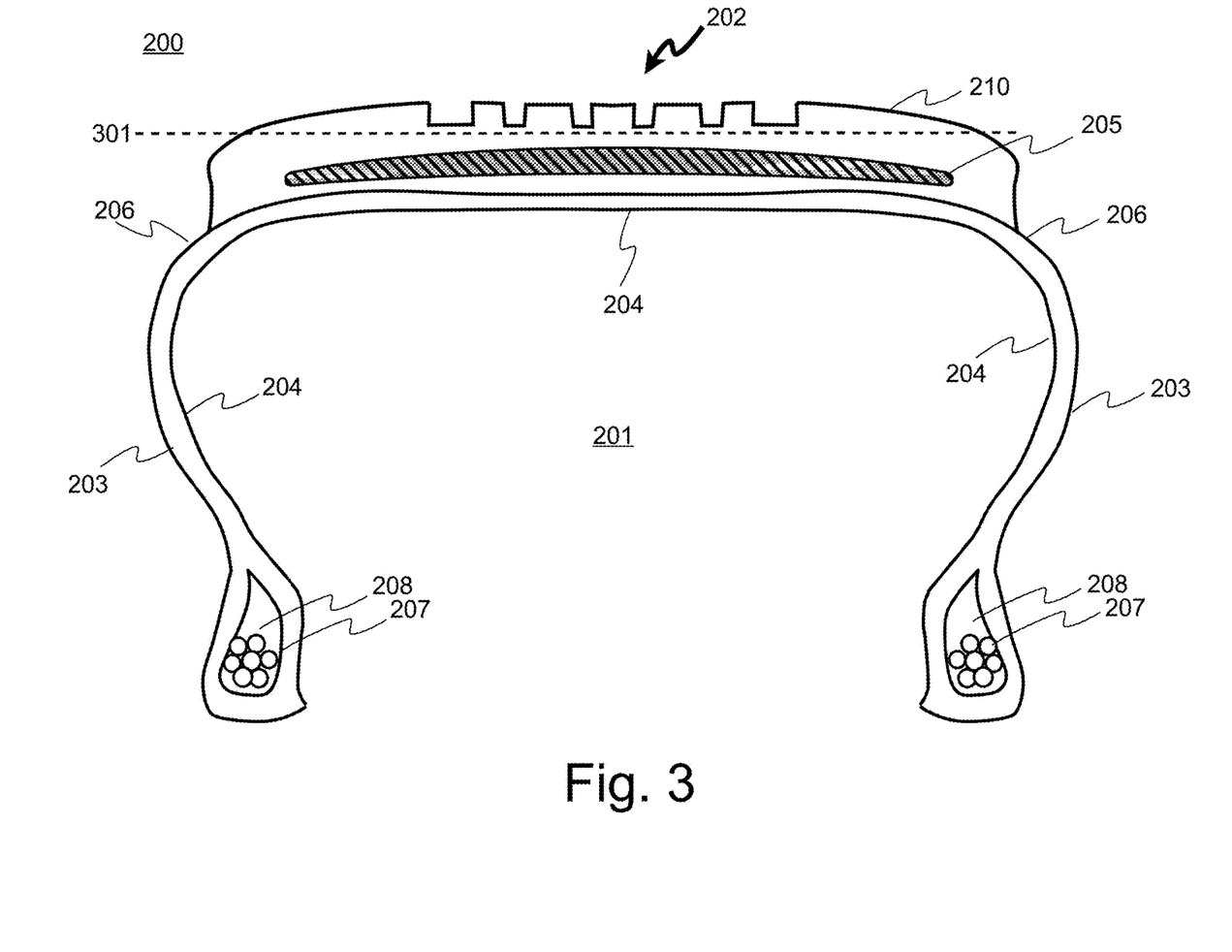
FIG. 3 shows an exemplary process to remove most or all of the blocks and grooves (tread texture) from a tread cap.

We will now describe a method according to the present invention of harvesting a strip of material from a tire for subsequent use in creating the material block as shown in FIGS. 8 and 9. FIG. 3 shows that the process removes most or all of the blocks and grooves from the tread cap to produce a substantially linear surface (301) on the outer circumference of the tire. In one embodiment, this is done by mounting the tire onto a wheel, inflating the tire, and rotating the tire while applying a rasp across the tread area until the desired amount of tread reduction has been achieved. The crumbs produced by the rasping operation may be used as a byproduct for other purposes.

Figure 4:
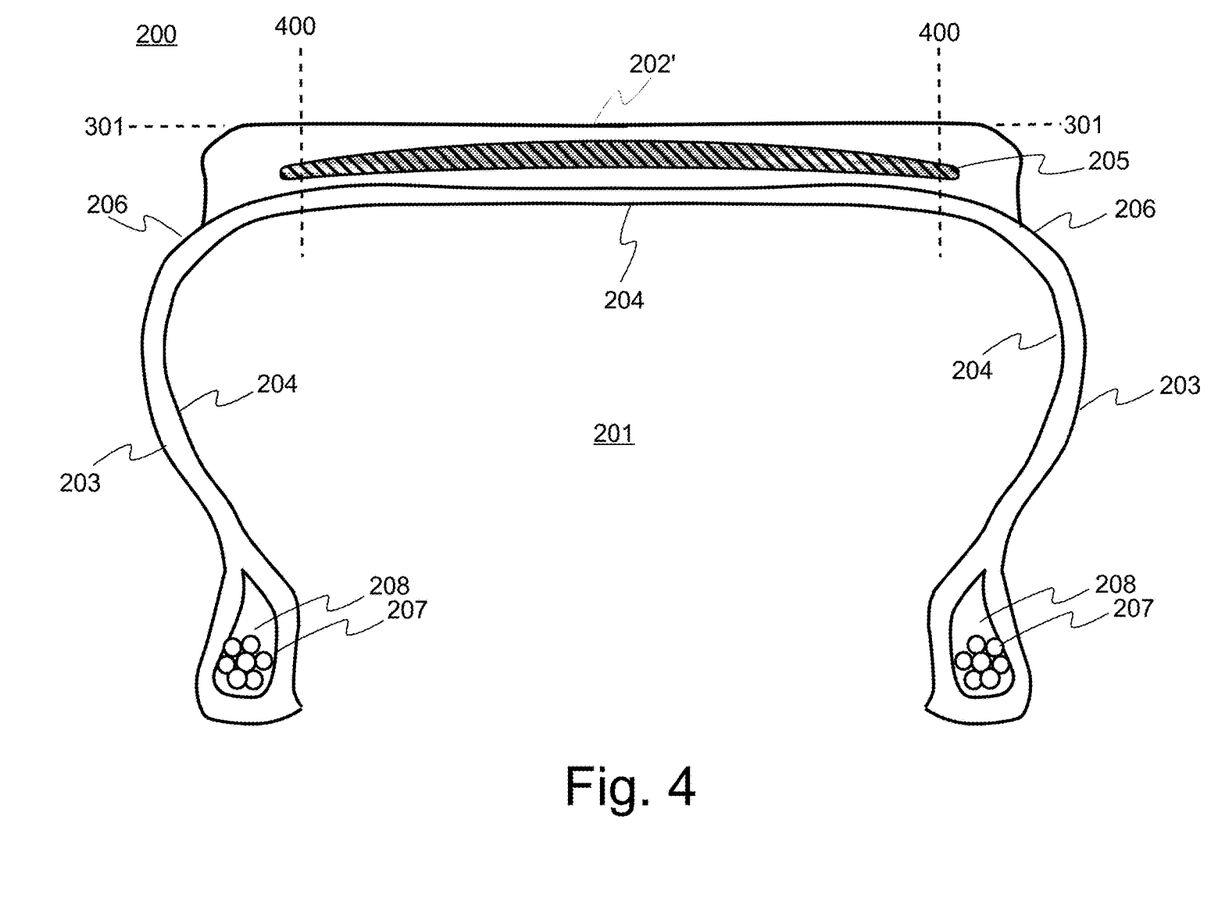
FIG. 4 shows an exemplary tire cross section after removing away the tread texture and exemplary points of cutting through the tread cap well away from the shoulders.
Figure 5:
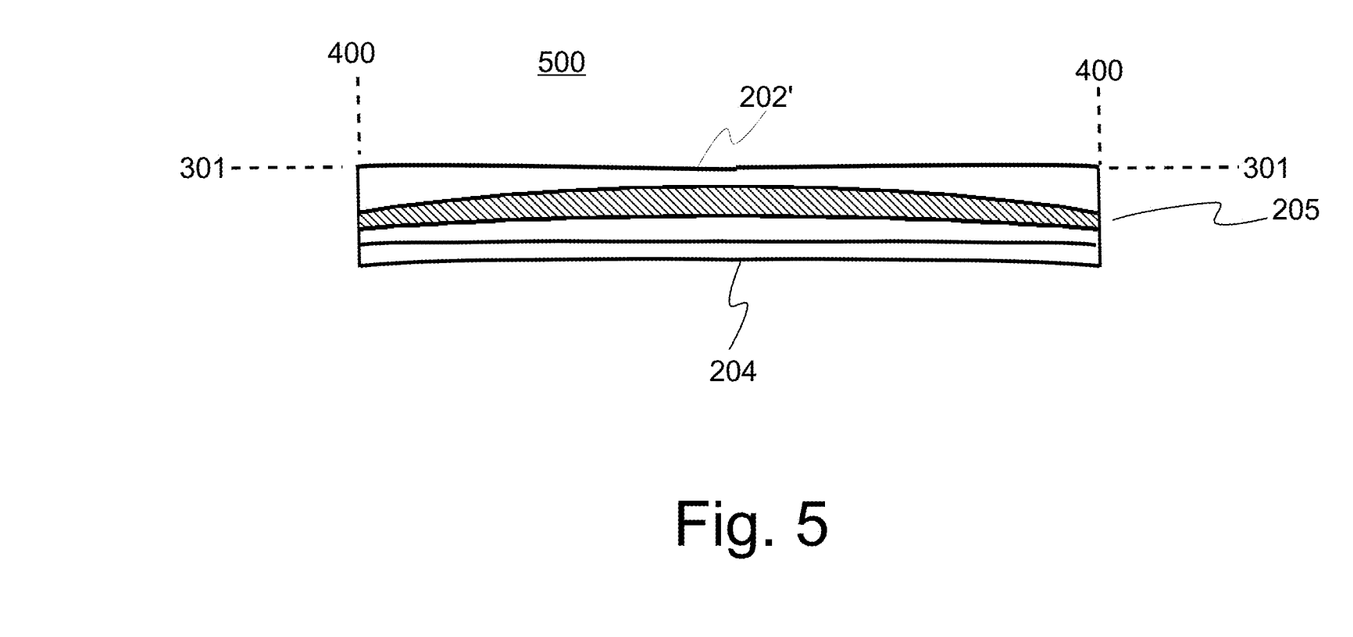
FIG. 5 shows an exemplary cross section of a final tread strip yielded from the harvesting process, with an original internal liner as a bottom surface, exposed belt portions on the long edges and across the edges where it was cut from a circle to a strip.

FIG. 4 shows the tire cross section (200) after rasping away the thread, with a new, and typically rough, surface 202' around the periphery of the tread cap. The tire is next subjected to cutting, by blade or water knife or other suitable means, orthogonally through the tread cap at points (400) well within the tread away, and well away from the shoulders (206). In previously-known and previously-used methods, the cutting was performed through the thinner, more-easily cut shoulders. However, cutting at the shoulders leaves a portion of the shoulder depending inwards towards the center of the tire, which causes the subsequent strip to want to curl, and the requires internal plates and fasteners to force into a flat or planar position. In the present invention, this problem is avoided by cutting (400) through the tread cap away from the shoulder, and typically through the extreme edges of the belts (205). This is a more difficult cut than cutting through the shoulders, but yields a must flatter strip of material when the final cut across the width w of the tread cap is made. FIG. 5 shows the cross section of the final strip (500) yielded from the harvesting process, with a rough upper surface (202') from the rasping, the original internal liner (204) as a bottom surface, and typically exposed belt portions (205) on the long edges and across the edges where it was cut from a circle to a strip. This strip now serves as an elemental block of material to be used as a layer in the final end-product.

Figure 6:
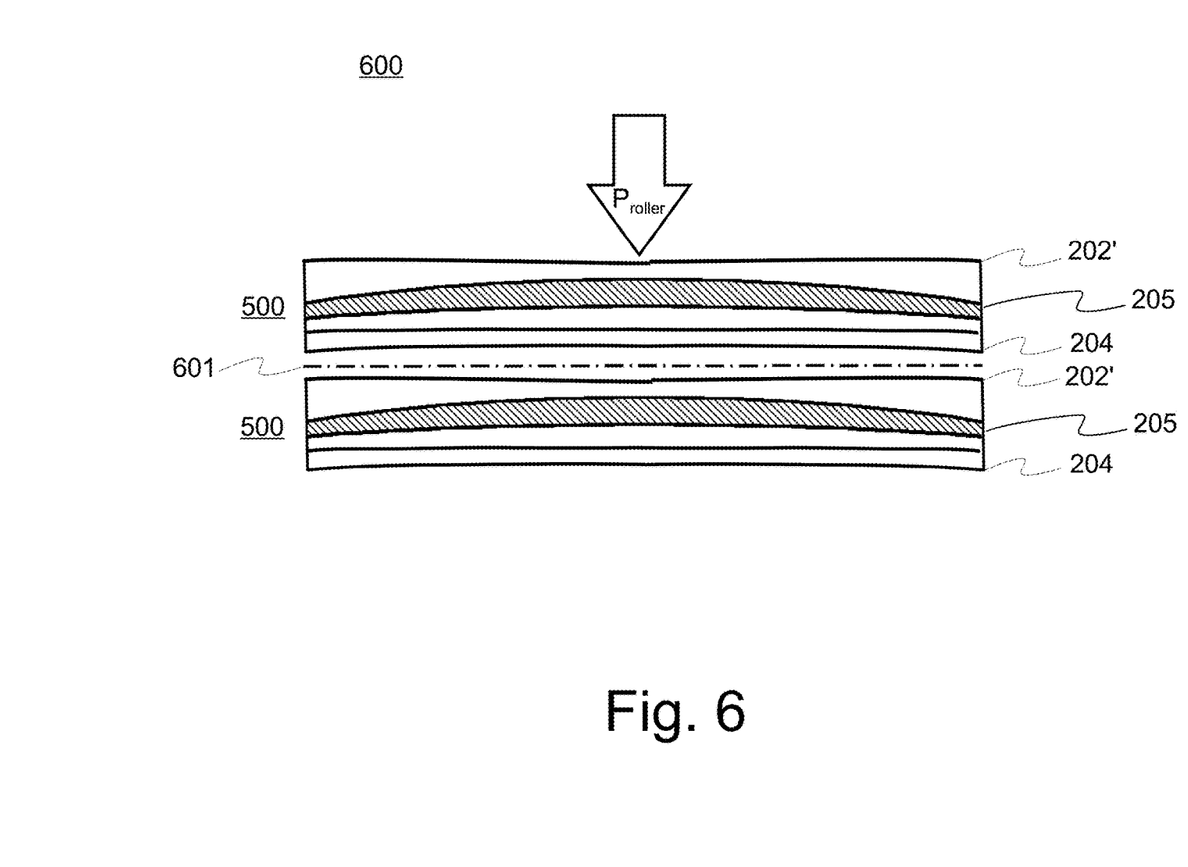
FIG. 6 shows an exemplary two harvested tread strips stacked vertically on top of each other.

FIG. 6 shows how two elemental blocks (500) are stacked vertically on top of each other, optionally using the afore-mentioned indexing holes and pins. The bottommost (first) layer is pre-heated, and a layer of pre-heated gum (601) is applied to the rough top surface (202') of it. A second pre-heated elemental block is then laid on top of the first layer, capturing the gum layer between its bottom surface (204) and the top surface (202') of the bottom layer. Because of the slight internal curvature of the bottom surface (204) of the second layer, a small gap may form between the two layers. So, while maintaining both layers in a heated environment, downward pressure $P_{roller}$ is applied by roller in a sufficient force to press way this gap.

Figure 7:
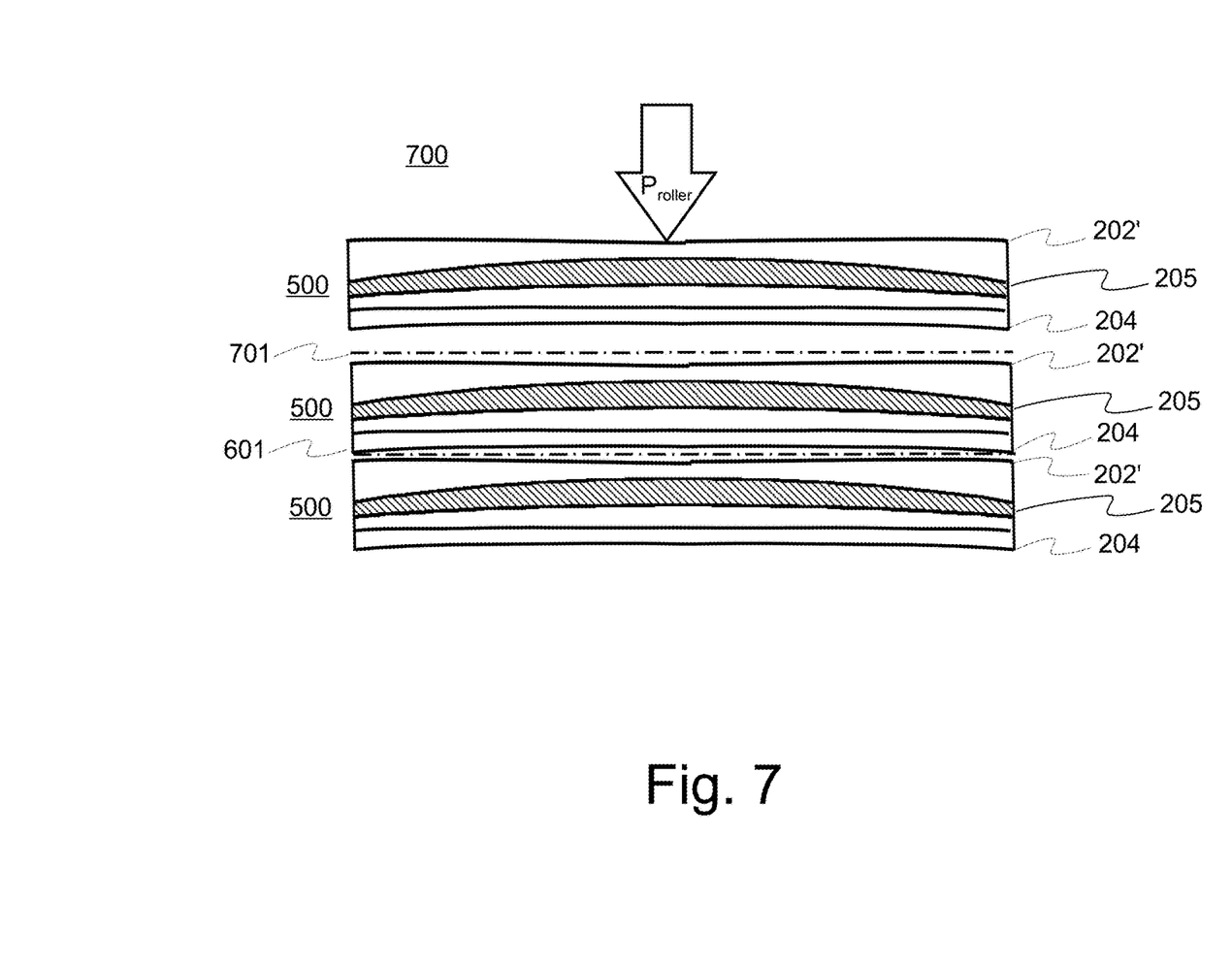
FIG. 7 illustrates the addition of a third tread strip to the stack of FIG. 6.

While maintaining the first two layers in a heated environment, a second pre-heated layer of gum (601) is applied to the rough top surface (202') of the second layer, and third pre-heated elemental block (500) is laid on top of the second layer, capturing the second gum layer (701) between its bottom surface (204) and the top surface (202') of the second layer, as shown in FIG. 7. And, as before, downward pressure $P_{roller}$ is applied by roller in a sufficient force to the top surface (202') of the third layer to press way any gap between the second and third layers, while maintaining all three layers in a heated environment.

This process is continued by adding additional individual layers with interposed gum layers in a heated environment, and pressing out any gaps as required, until the desired depth d is achieved for the final work product, as shown in FIGS. 8 and 9. In one embodiment of this process, the final work product has a depth equal approximately to the thickness of the harvested blocks times the number of layers laminated together, a width equal to the distance between the cut points (400) through the tread cap, and a length approximately equal to the outer periphery of the tire.

Figure 1:
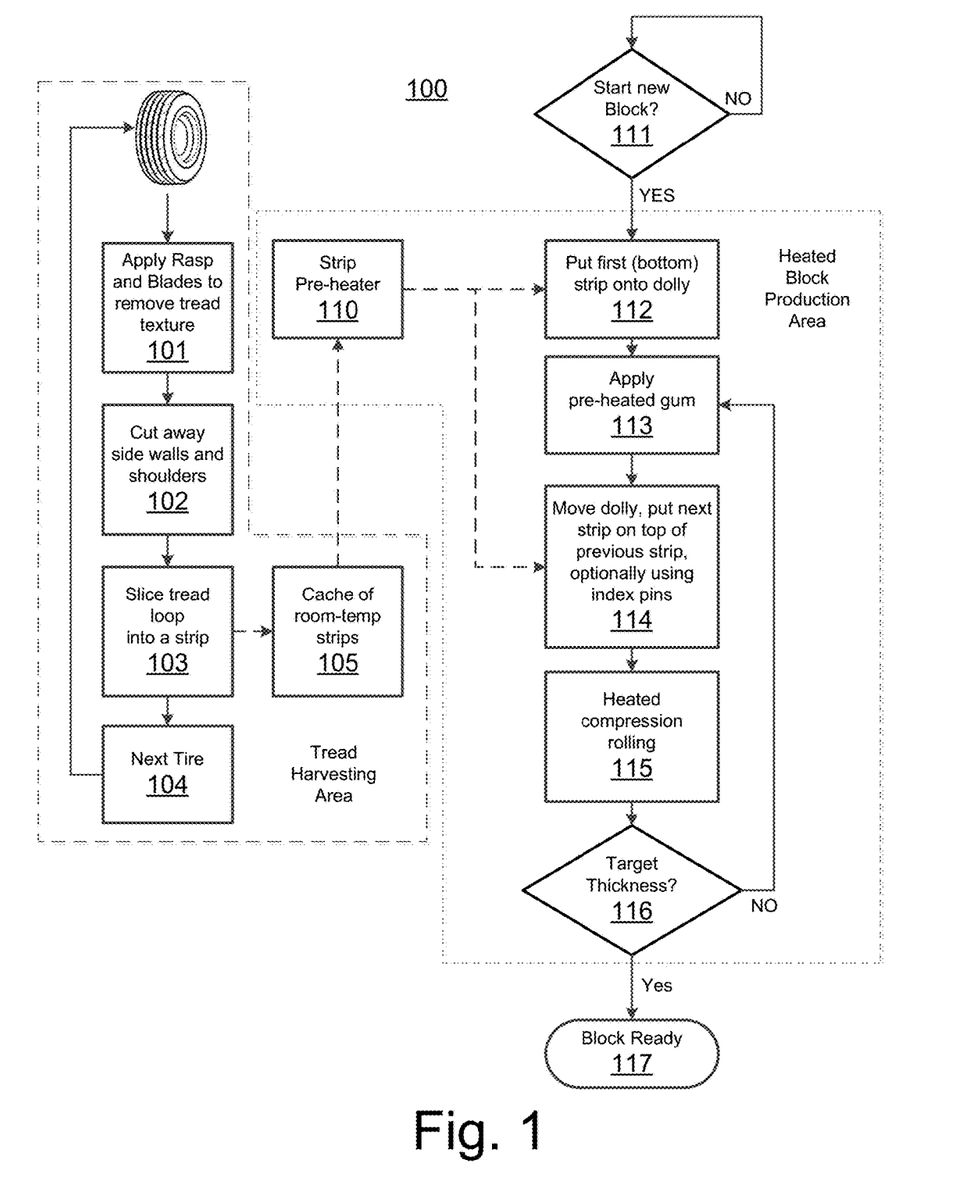
FIG. 1 shows to a process according to the present invention for harvesting tread strips (elemental blocks) from tires and producing a block of construction material.

Referring now to FIG. 1, a process (100) according to the present invention for harvesting tread strips (elemental blocks) from tires and producing a block of construction material is shown. A tire is received onto a wheel and inflated. Then, the wheel and tire are spun while a rasp, blade, grinder or other device is applied to the tread on the periphery of the tire to remove (101) the tread texture. In some embodiments, all of the tread texture may be removed, while in other embodiments, part of the tread texture may be removed. The yielded crumbs can be collected and used or sold as a process by-product, but are not otherwise needed in the rest of the process according to the present invention.

After removing the tread texture, the side walls and shoulders are removed (102) from the tire, such as by cutting through the tread cap using blades, lasers, water knives, etc., at a point (400) away from the shoulders and into the tread cap itself, thereby completely separating the sidewalls and shoulders from the tread loop. The yielded sidewall-shoulder portions can be collected and used or sold as a process by-product, but are not otherwise needed in the rest of the process according to the present invention.

The tread loop is then sliced (103) across the width of the tread cap to produce a tread strip having a thickness of the tread cap plus the inner liner and body portion minus the thread depth removed (101), a width of approximately the tread width of the tire (less shoulders' width), and a length approximately the circumference of the uninflated tire. The tread strip is then cached (105), optionally at room temperature, until it is integrated into a material block, and the next tire (104) is prepared (mounting, inflating) for tread texture removal (101).

Continuing with the portion of the illustrated process (100) according to the present invention, a first tread strip is pre-heated (110), preferably to 160° F. to 250° F. using an infrared (IR) heat source, and optionally one or more index holes are formed into the strip in a direction through the top surface (202') and the bottom surface (204). The tread strip is then placed (112) onto a dolly or cart in a heated production area to maintain the heated temperature of the tread strip, optionally with one or more index pins protruding upwards from the dolly and through the one or more index holes in the tread strip. This first strip becomes the bottom strip of a multi-strip stack to be produced into a building material block.

Next, pre-heated gum is applied (113) to the top surface (202') of the first strip. Gum pre-heating is preferably performed to 160° F. to 250° F. The dolly, while still in a heated production area, is moved (114) to receive a second pre-heated (110) strip, optionally aligning the second tread strip vertically on the first tread strip using the index pins and holes.

Now, the first two tread strips are compressed (115), preferably using rollers, to remove any gaps between the slightly curved bottom surface (204) of the second tread strip and the top surface (202') of the first (bottom) tread strip. The two tread strips remain on the dolly, as the gum application (113) is repeated on the top surface (202') of the second strip, the dolly is moved to receive a third pre-heated (110) third tread strip, and the pressing (115) is applied to the three-strip stack of materials. This process is repeated (116) until the desired depth $d_{stack-N}$ is achieved using N tread strips. For example, when using long-haul truck tires as the source material, a stack of seven harvested tread strips will yield a depth of approximately 8.25", a width of about 10", and a length of about 10'.

After cooling, the final produced block of building material is now ready (117) for packaging and shipping to a consumer for further use in end-user products. Not shown in this exemplary process (100) according to the invention may be additional grinding, cutting, shaping, sealing, painting, coating, etc., to adjust the final dimensions, UV resilience, color, and/or surface texture or ornamentation.

Telescoping Index Pins.

In one enhanced embodiment, the dolly is equipped with telescoping or otherwise extendable indexing pins to be received in the index holes (901) which are optionally provided through the depth d of the block (900). In this manner, the indexing pins can be retracted such that they initially only extend through and above the first tread strip on the dolly an amount sufficient for aligning the second tread strip, but not further. This allows handling equipment to move freely horizontally across the top of the stack while minimizing vertical movement to place the second tread strip on top of the first tread strip, and may also reduce interference of the indexing pins with the mechanisms which apply the pre-heated gum to the top of the first tread strip.

Then, when a third tread strip is to be added to the stack, the indexing pins are extended just above the second strip enough to receive the third strip, but not to protrude through the third strip, and so forth, until the final tread strip is added to the stack.

Agricultural Fence Post.

In additional cutting, shaping, grinding, and drilling operations, the block construction material made of the stacked tread strips can be fabricated into a fence post suitable for agricultural use, such as by providing holes or notches to receive barbed wire, welded wire mesh, cross members, slats, etc.

Cross-traffic Vehicle Catcher Post.

In additional cutting, shaping, grinding, and drilling operations, the block construction material made of the stacked tread strips can be fabricated into a post suitable for use with roadway cross-traffic vehicle catcher systems, such as by providing holes or notches to receive the taught cables which run horizontal in such systems.

Dock Bumper.

In additional cutting, shaping, grinding, and drilling operations, the block construction material made of the stacked tread strips can be fabricated into a bumper suitable for use on loading docks for long-haul trucking distribution warehouses, as well as bumpers for boats on docks.

Railroad Crosstie.

In additional cutting, shaping, grinding, and drilling operations, the block construction material made of the stacked tread strips can be fabricated into a crosstie suitable for use in a railway bed.

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A process for producing a block of construction material comprising the steps of:
    harvesting a plurality of tread strips from a plurality of tires by, for each tire:
        removing a tread texture of a tread cap from each tire using a tread removal device while leaving a remaining portion of the tread cap intact with one or more sidewalls and shoulders of each tire;
        removing one or more side walls and entire shoulders from each tire by cutting through the remaining portion of each tread cap; and
        slicing the remaining portion of each tread cap across a width of each tread cap to produce tread strips, each tread strip having an inner liner portion and a body portion of a tire from which it was harvested; and
    preheating each tread strip to a temperature between 160° F. to 250° F., inclusive;
    providing one or more holes through each tread strip;
    while maintaining the temperature of each tread strip, stacking the plurality of tread strips upon each other subsequent to disposing a pre-heated gum between each pair of tread strips and applying compression force to flatten and remove gaps between the stacked tread strips, while employing one or more indexing rods through the one or more holes through each tread strip to maintain alignment of the stacked tread strips; and
    allowing the gummed, stacked and pressed tread strips to cool, thereby yielding a block of construction material while avoiding the use of fasteners, plates and membranes to maintain the stacked tread strips into a block arrangement.

2. The process as set forth in claim 1 in which the removing of tread texture is performed by one or more tread removal devices selected from the group consisting of a rasp, a blade, and grinder.

3. The process as set forth in claim 1 wherein, prior to the removing of tread texture, the tire is mounted in a wheel, the tire is inflated, and wherein the step of removing tread texture further comprises spinning the wheel and tire while applying the tread removal device.

4. The process as set forth in claim 1 wherein the cutting through the remaining portion of each tread cap is performed at least in part using a cutting device selected from the group consisting of a blade, a laser, and a water knife.

5. The process as set forth in claim 1 wherein the cutting through the remaining portion of each tread cap comprises cutting through the tread cap at a position which cuts through one or more belts in the tread cap.

6. The process as set forth in claim 1 wherein the pre-heating is performed using one or more heating devices selected from the group consisting of an infrared light source, a heated air source, a convective heat source, a conducted heat source, and a heated liquid source.

7. The process as set forth in claim 1 wherein the stacking is performed by accumulating the stacked tread strips onto a moveable dolly, and wherein the moveable dolly shuttles between a gum-application position, a next-tread-strip-stacking position, and a compression position, while maintaining the stack at the pre-heated temperature.

8. The process as set forth in claim 1 wherein the yielded block of construction material comprises seven tread strips, and has final block dimensions of approximately 8.25 inches deep by approximately 10 inches wide by approximately 10 feet long.

9. The process as set forth in claim 1 further comprising one or more post-production steps selected from the group consisting of grinding, cutting, shaping, sealing, painting, and coating, to adjust one or more characteristics of the material block selected from the group consisting of the final dimensions, the final shape, ultra-violet light resilience, exterior color, exterior surface texture and exterior ornamentation.

* * * * *